United States Patent
Subramaniyam

(10) Patent No.: US 7,575,669 B2
(45) Date of Patent: Aug. 18, 2009

(54) METHOD OF REMOVAL OF CARBONYL COMPOUNDS ALONG WITH ACID GASES FROM CRACKED GAS IN ETHYLENE PROCESS

(75) Inventor: Mahesh Subramaniyam, Maharashtra (IN)

(73) Assignee: Dorf Ketal Chemicals, LLC, Stafford, TX (US)

( * ) Notice: Subject to any disclaimer, the term of this patent is extended or adjusted under 35 U.S.C. 154(b) by 457 days.

(21) Appl. No.: 11/021,389

(22) Filed: Dec. 23, 2004

(65) Prior Publication Data

US 2005/0224394 A1 Oct. 13, 2005

Related U.S. Application Data

(63) Continuation-in-part of application No. PCT/IN02/00195, filed on Sep. 30, 2002.

(60) Provisional application No. 60/391,717, filed on Jun. 26, 2002.

(51) Int. Cl.
  *C10G 11/00* (2006.01)
  *C10G 9/00* (2006.01)
  *C10G 9/16* (2006.01)
  *C10G 9/12* (2006.01)
  *C10G 75/04* (2006.01)

(52) U.S. Cl. .................. 208/100; 208/47; 208/48 AA; 208/48 R

(58) Field of Classification Search ................ 208/100, 208/48 AA, 48 R, 47
See application file for complete search history.

(56) References Cited

U.S. PATENT DOCUMENTS

| 2,702,793 A | 2/1955 | Smith |
| 2,862,885 A | 12/1958 | Nelson et al. |
| 2,884,474 A | 4/1959 | Finigan et al. |
| 3,535,399 A | 10/1970 | Tabler |
| 3,600,454 A | 8/1971 | Jhawar |

(Continued)

FOREIGN PATENT DOCUMENTS

CA   1107672 A1   8/1981

(Continued)

OTHER PUBLICATIONS

C. S. Mavel et al, Some Derivatives of epsilon-Caprolactam, Sep. 1957, Contribution from the Notes Chemical Laboratory, University of Illinois, p. 1065-1067.*

(Continued)

*Primary Examiner*—Walter D Griffin
*Assistant Examiner*—Natasha Young
(74) *Attorney, Agent, or Firm*—Conley Rose, P.C.; Rodney B. Carroll

(57) ABSTRACT

A method for mitigating fouling in a wash unit used in a hydrocarbon cracking process wherein the fouling is due to the presence of polymers and deposits thereof formed by condensation of carbonyl compounds contained within a feed stream of the wash unit. In one embodiment, the invention provides a method of mitigating fouling in a wash unit by introducing into the feed stream an effective amount of an additive including: an inorganic salt of dithionite; and an epsilon caprolactam or a 6-amino caproic acid derivable therefrom. The additive scavenges the carbonyl compounds contained within the feed stream and dissolves deposits of the polymers to thereby mitigate fouling in the wash unit.

21 Claims, 2 Drawing Sheets

A.

x = 1 to 10
Y = S or C
Z = Na, Li or Mg

B.

x = 1 to 10
Y = S or C
X = HCl, H₂SO₄, or HClO

C.

Y = S or C
Z = Na, Li or Mg

D.

Y = S or C
Z = Na, Li or Mg
x = 1 to 10

U.S. PATENT DOCUMENTS

| | | | |
|---|---|---|---|
| 3,645,886 A | 2/1972 | Gillespie et al. | |
| 3,668,111 A | 6/1972 | Dvoracek et al. | |
| 3,793,187 A | 2/1974 | Marx et al. | |
| 4,005,044 A | 1/1977 | Raleigh | |
| 4,329,528 A | 5/1982 | Evans | |
| 4,473,465 A | 9/1984 | Veatch et al. | |
| 4,578,178 A | 3/1986 | Forester | |
| 4,673,489 A | 6/1987 | Roling | 208/289 |
| 4,952,301 A | 8/1990 | Awbrey | 208/48 |
| 4,961,840 A | 10/1990 | Goyal | |
| 5,160,425 A | 11/1992 | Lewis | 208/95 |
| 5,194,143 A | 3/1993 | Roling | 208/291 |
| 5,220,104 A | 6/1993 | McDaniel et al. | 585/853 |
| 5,221,461 A | 6/1993 | Henrici et al. | |
| 5,264,114 A | 11/1993 | Dunbar | 208/48 |
| 5,288,394 A | 2/1994 | Lewis et al. | 208/48 |
| 5,354,450 A | 10/1994 | Tong et al. | |
| 5,389,299 A | 2/1995 | Hart | |
| 5,445,743 A | 8/1995 | Rowe et al. | |
| 5,454,979 A | 10/1995 | Kobayashi et al. | |
| 5,472,637 A | 12/1995 | Hart | |
| 5,488,141 A * | 1/1996 | Bauer et al. | 560/218 |
| 5,582,808 A | 12/1996 | Patek | |
| 5,656,150 A | 8/1997 | Reed et al. | |
| 5,667,669 A | 9/1997 | Hart | |
| 5,710,455 A | 1/1998 | Bhatnagar et al. | |
| 5,714,055 A | 2/1998 | Lewis et al. | 208/48 |
| 5,750,052 A | 5/1998 | Hart et al. | |
| 5,770,041 A | 6/1998 | Lewis et al. | 208/48 |
| 5,789,613 A * | 8/1998 | Bauer et al. | 560/218 |
| 5,800,738 A | 9/1998 | Hart | |
| 5,985,940 A | 11/1999 | Manek et al. | |
| 6,063,725 A * | 5/2000 | Sunaga et al. | 502/109 |
| 6,372,121 B1 | 4/2002 | McClain et al. | 208/48 |
| 6,838,579 B2 | 1/2005 | Auer et al. | |
| 2003/0004284 A1* | 1/2003 | Bottcher et al. | 526/82 |
| 2003/0205503 A1* | 11/2003 | Subramaniyam et al. | 208/48 AA |
| 2004/0015032 A1 | 1/2004 | Ramaswamy et al. | |

FOREIGN PATENT DOCUMENTS

| | | |
|---|---|---|
| CN | 1649982 A | 8/2005 |
| DE | 23 33 588 | 2/1975 |
| EP | 0 264 280 | 10/1987 |
| EP | 0619361 A2 | 10/1994 |
| EP | 686622 A1 * | 12/1995 |
| EP | 0 824 142 | 8/1997 |
| EP | 0698652 B1 | 10/1999 |
| EP | 1 116 778 | 12/2000 |
| FR | 2397450 A1 | 2/1979 |
| JP | 343494 A | 2/1991 |
| JP | 5156233 A | 6/1993 |
| JP | 2002503749 A | 2/2002 |
| WO | 9941328 A1 | 8/1999 |
| WO | 0155071 A1 | 8/2001 |
| WO | WO 02 36715 | 5/2002 |
| WO | 2004003110 A1 | 1/2004 |
| WO | 2004007642 A1 | 1/2004 |

OTHER PUBLICATIONS

Foreign Communication from a counterpart application-International Preliminary Examination Report, PCT/IN02/00195, Sep. 10, 2004, 12 pages.

Foreign communication from a related counterpart application—European Patent Office Examination of Application No. 02 781 738 6, Aug. 16, 2005, 6 pages.

Foreign communication from a related counterpart application—International Search Report, PCT/IN02/00195, Jun. 6, 2003, 5 pages.

Foreign communication from a related counterpart application—Invitation to Pay Additional Fees, PCT/IN02/00195, Mar. 10, 2003, 4 pages.

Foreign communication from a related counterpart application—Written Opinion, PCT/IN02/00195, Mar. 10, 2004, 8 pages.

Foreign communication from a related counterpart application—Written Opinion, PCT/IN02/00196, Apr. 5, 2004, 6 pages.

Japanese Office Action dated Mar. 11, 2008 (6 pages), Japanese Patent Application No. 2004-521071 corresponding to U.S. Appl. No. 10/196,725 and International Application No. PCT/IN02/000196.

Advisory Action dated Dec. 31, 2008 (3 pages), U.S. Appl. No. 10/196,725, filed Jul. 16, 2002.

Office Action dated Jul. 14, 2005 (11 pages), U.S. Appl. No. 10/196,725, filed Jul. 16, 2002.

Office Action dated Jan. 24, 2006 (6 pages), U.S. Appl. No. 10/196,725, filed Jul. 16, 2002.

Office Action dated Mar. 17, 2008 (7 pages), U.S. Appl. No. 10/196,725, filed Jul. 16, 2002.

Office Action (Final) dated Oct. 31, 2008 (8 pages), U.S. Appl. No. 10/196,725, filed Jul. 16, 2002.

* cited by examiner

A.

x = 1 to 10
Y = S or C
Z = Na, Li or Mg

B.

x = 1 to 10
Y = S or C
X = HCl, $H_2SO_4$, or HClO

C.

Y = S or C
Z = Na, Li or Mg

D.

Y = S or C
Z = Na, Li or Mg
x = 1 to 10

E.

Y = S or C
Z = Na, Li, Mg or K
x = 1 to 10

F.

Y = S or C
Z = Na, Li, Mg or K
x = 1 to 10

G.

Y = S or C
x = 1 to 10

METHOD OF REMOVAL OF CARBONYL COMPOUNDS ALONG WITH ACID GASES FROM CRACKED GAS IN ETHYLENE PROCESS

CROSS-REFERENCE TO RELATED APPLICATIONS

This is a continuation-in-part application claiming priority to International application PCT/IN2002/000195, filed Sep. 30, 2002, which designates the United States of America and claims the benefit of U.S. provisional application 60/391,717, filed Jun. 26, 2002, both of which are incorporated by reference herein to the extent they are not inconsistent with the disclosure herein.

TECHNICAL FIELD OF THE INVENTION

The present invention generally relates to a method of removing undesired byproducts from pyrolytic cracking of hydrocarbons. The invention more particularly relates to a method for removal of carbonyl compounds not only like acetaldehyde and other carbonyl compounds but also its polymer along with the other acidic gases like $H_2S$ and $CO_2$ that are formed when cracked gases enter a caustic or an amine unit within an ethylene plant where the cracked gases are produced in a pyrolysis heater during the pyrolytic cracking of hydrocarbon such as naphtha, gas oil or ethane, propane, butane and such other hydrocarbons.

BACKGROUND OF THE INVENTION

In pyrolytic cracking operations, feed stocks such as ethane, propane, naphtha, kerosene, gas oil, fuel oil and the like undergo "cracking," that is the removal of hydrogen, to form unsaturated hydrocarbons. Pyrolytic cracking also tends to produce oxygenated hydrocarbons, including carbonyl compounds such as acetaldehyde. In a typical operation, the cracked effluent stream is quenched, fractionated and compressed. Acidic contaminants such as hydrogen sulfide, carbon dioxide and mercaptans are then typically removed from the effluent.

During the scrubbing operation of these gases with caustic or amine some oxygenated compounds are removed. At the same time, however, the basic conditions in the scrubber tend to cause base-induced condensation reactions (due to aldol condensation mechanism) of the carbonyl compounds, including aldehydes (e.g., acetaldehyde) and/or ketones, which in turn result in the formation of polymers. These polymers deposit on the internal surfaces of the scrubber. As the mass of polymer grows, it leads to fouling and can eventually obstruct the flow of liquids through the system. This is undesirable, as the operating system must be shut down for a significant amount of time in order to remove the deposited polymer and clean the equipment. This operation itself is very expensive involving many man hours and fmancial loss.

The prior art systems treat caustic towers with an injection of a compound to inhibit the aldol condensation mechanism. In order to inhibit aldol condensation the prior art systems mostly use additives that are organic in nature and contribute to chemical oxygen demand for caustic used in the scrubbing process.

In addition, the prior art additives typically require additive to reactant (i.e., carbonyl compound) molar ratios to be of at least about 1:1 for effective performance. Further the adducts of the high molecular weight polymers with these compounds tend to be insoluble in the basic system. Thus, the prior art additives are ineffective for the purpose of maintaining unobstructed flow through the system and reducing significant maintenance time for removing the polymer deposits and cleaning the equipment.

A current practice in the industry is to treat the weak caustic in the caustic tower with gasoline or another aromatic fraction in order to remove the polymers before sending it to the spent caustic oxidation unit, in order to prevent fouling there. The resulting gasoline-containing stream causes disposal and operational problem, however. Likewise, routing the gasoline-containing stream to other operating units can cause problems due to the presence of the caustic, as it may affect pH, catalyst and other plant parameters.

Another current practice in the industry is to treat the caustic tower with organic additives and despite the various advances in the art it remains desirable to provide an alternative method to improve the performance of this particular unit in the industry. There have also been shortcomings discussed later when any of these additives have been used concurrently to provide a synergistic effect in such systems.

In the past, prevention of polymerization of oxygenated compounds, such as carbonyl containing organics in basic solutions, has been attempted by process of inhibition only by adding amine compounds such as hydroxylamine hydrochloride, hydroxylamine sulfate, hydrazine, carbohydrazides and the like. Several patents which relate to methods of inhibiting carbonyl fouling due to polymerization are listed below. It is found that these patents discuss only the removal of carbonyl compounds but fail to address the issue of polymers which are formed as a result of polymerization of unscavenged portion of the carbonyl compounds during the use of inhibiting additive and also of polymers already existing in the system. Thus these patents discuss only the method of inhibition of polymerization.

U.S. Pat. No. 4,673,489 to Roling discloses using hydroxylamine and its salts of hydrochloric acid and sulfuric acid to inhibit polymer formation caused by condensation reactions of aldehydes contained in caustic scrubber units. One disadvantage of the method is that the additive has to be used in almost molar proportion. The other disadvantage is that these chemicals are expensive and must be over fed to the caustic wash unit system. This patent does not disclose a solution to the removal of carbonyl compounds and their polymers that remain unscavenged in the inhibition process, nor does it provide for removal of already existing polymers.

U.S. Pat. No. 4,952,301 to Awbrey discloses using ethylenediamines, with the molecular formula NH sub 2 (CH sub 2 CH sub 2 NH) sub x H were x is an integer ranging from about 1 to about 10, to inhibit carbonyl based fouling, particularly aldehyde fouling, that often occurs during caustic scrubbing of liquid or gas phase hydrocarbon streams in the base wash unit. This patent similarly does not provide a solution to removal of carbonyl compounds and polymers thereof that remain unscavenged during the inhibition process, nor does it solve the problem of removal of already existing polymers.

U.S. Pat. No. 5,264,114 granted to Dunbar also discloses the use of amine compounds to inhibit the deposition of foulants during caustic washing of the hydrocarbon gases contaminated with the carbonyl compounds. The method comprises of treating the said hydrocarbon gases with an aqueous amine solution, wherein 2 to about 5000 ppm of amine compound is selected from a group of organic compounds of the formula $RNH_2$ and $R_2NH$, R being selected from the group of alkyl or aryl groups. This patent does not discuss the problems related to removal of already existing polymers, nor does it provide solution for removal of carbonyl compounds and polymers thereof which are unscavenged during the inhibition process.

Carbohydrazide has been disclosed as useful for inhibiting polymeric fouling deposits during the caustic scrubbing of pyrolytically-produced hydrocarbons contaminated with oxygen-containing compounds in U.S. Pat. No. 5,160,425 to Lewis. Similarly, this patent does not discuss the problems related to removal of already existing polymers, nor does it provide solution for removal of carbonyl compounds and polymers thereof which are unscavenged during the inhibition process.

U.S. Pat. No. 5,288,394 to Lewis and Rowe describes a method of inhibiting formation of polymeric fouling deposits after the caustic scrubbing of hydrocarbon stream contaminated with oxygenated compounds. The scrubbing is performed with a basic washing solution having pH more than 7, and comprising at least one hydrazide compound. Similarly, this patent does not discuss the problems related to removal of already existing polymers, nor does it provide solution for removal of carbonyl compounds and polymers thereof which are unscavenged during the inhibition process.

U.S. Pat. No. 5,194,143, granted to Roling describes and claims a method for inhibiting the formation of polymeric based fouling deposits during the basic washings of olefins containing hydrocarbon contaminated with oxygenated compounds comprising adding to the wash about 1 to 10000 ppm acetoacetate ester compound having the formula CH sub 3 COCH sub 2 c sub x H sub, where x is an integer from about 1 to about 8 and y is an integer from about 3 to about 17. Similarly, this patent does not discuss the problems related to removal of already existing polymers, nor does it provide solution for removal of carbonyl compounds and polymers thereof which are unscavenged during the inhibition process.

U.S. Pat. No. 5,220,104 to McDaniel at al. discloses the use of percarbonate salts for inhibition of fouling. Similarly, this patent does not discuss the problems related to removal of already existing polymers, nor does it provide solution for removal of carbonyl compounds and polymers thereof which are unscavenged during the inhibition process.

U.S. Pat. No. 5,770,041 to Lewis et al. describes the use of certain aldehydic compounds without alpha hydrogen atom or the use of non-enolizable aldehydes like formaldehyde, glyoxal and the like as aldol inhibitor. In this case the inhibitors are to be used at least thrice the molar ratio per mole of carbonyl species. Similarly, this patent does not discuss the problems related to removal of already existing polymers, nor does it provide solution for removal of carbonyl compounds and polymers thereof which are unscavenged during the inhibition process.

U.S. Pat No 5,710,455 to Bhatnagar et al. discloses the use of certain organic amine inhibitors like sulfanilic acid for inhibiting the aldol condensation. Similarly, this patent does not discuss the problems related to removal of already existing polymers, nor does it provide solution for removal of carbonyl compounds and polymers thereof which are unscavenged during the inhibition process.

All the patents of the prior art discussed above discuss treatment of the caustic with injection of a compound only to inhibit polymer formation by aldol condensation mechanism. They do not, however, solve the problem of removal of the polymers already present in the system.

Apart from the above mentioned disadvantages there are serious technical problems that exist with the prior art. For instance, one serious technical problem is the extremely rapid polymer formation; it typically takes place within few minutes, rendering impossible the complete scavenging of the carbonyl compounds by any known polymerization inhibition process. Obviously, an important requirement for inhibition of polymerization is that the inhibitor be present in the caustic tower before the carbonyl compounds enter the tower. Delay in supply of the inhibitor or incomplete availability of the inhibitor in the caustic tower will cause the carbonyl compounds to polymerize within few minutes, a process which is very detrimental to the unit leading to fouling. The unscavenged part of carbonyl compounds polymerizes and deposits on the trays, leading to fouling and plugging of the equipment, and eventually to equipment failure.

Another important technical problem is that the inhibitor used by other researchers can react only with nonpolymerized carbonyl compounds and with very low molecular weight caustic soluble species (2 or 3 repeating units of acetaldehyde), but not with high molecular weight polymers (having greater than 3 repeating units of acetaldehyde). It is precisely the high molecular weight polymers that are insoluble in the caustic system, thereby depositing and fouling the equipment. Hence there is a need to develop a method which that will not only inhibit the formation of polymers, but will also lead to dissolving the polymers already existing in the caustic tower and its downstream units.

SUMMARY OF THE INVENTION

During scrubbing operations in the caustic or amine towers in the chemical industry, condensation reactions of carbonyl compounds lead to formation of polymers, which further leads to fouling and obstructing the flow of liquid through the system. The present invention provides a method to mitigate fouling that occurs due to polymerization of carbonyl compounds. This mitigation is achieved by using certain inorganic salts like sodium dithionite, sodium metabisulphite, certain amino acids like amino caproic acid, sulfanilic acid, and combinations thereof as additives for washes of caustic towers. The compounds disclosed in this invention inhibit polymer formation. The compounds scavenge the carbonyl compounds thereby inhibiting polymerization; in addition, the compounds dissolve polymers formed as the result of the reaction, as well as the polymers already existing in the caustic tower. Furthermore, the present invention can be used along with the caustic in the caustic tower, i.e., the compounds of the invention can be premixed with the caustic used for making the scrubbing solution.

Accordingly, one objective of the present invention is the inhibition of the formation of polymers of carbonyl compounds in a caustic scrubber; a benefit of this is the inhibition of fouling that occurs due to oxygenated hydrocarbons. Another objective of the invention is to dissolve the polymers in a caustic scrubber which are formed in spite of the inhibitory action, as well as to dissolve the polymers that exist in the scrubber. One objective of the invention is to reduce the concentration of oxygenated hydrocarbons, particularly carbonyl compounds in caustic or amine towers used in the chemical industry, and equipment and products thereof. Yet another objective of the invention is to scavenge oxygenated hydrocarbons without posing polymerization problems and without interfering with plant operations, nor with individual process operations. Still further objective of the invention is to provide an inventive product which can be premixed with the caustic that is used for making the scrubbing solution. Yet further objective is to develop an inventive combination of chemicals that react with nonpolymerized carbonyl compounds, with low molecular weight species, and with high molecular weight carbonyl polymers, such that the reacted adduct is soluble in the caustic solution, thereby preventing plugging and fouling of the equipment.

DETAILED DESCRIPTION OF THE INVENTION

Figure 1:
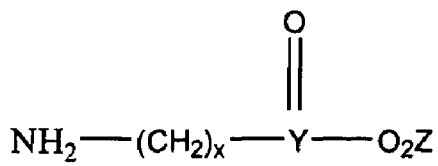
FIGS. 1 and 2 depict chemical compounds useful in the present invention.
Figure 1:
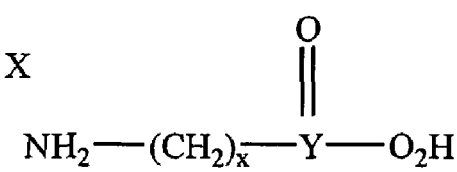
Figure 1:
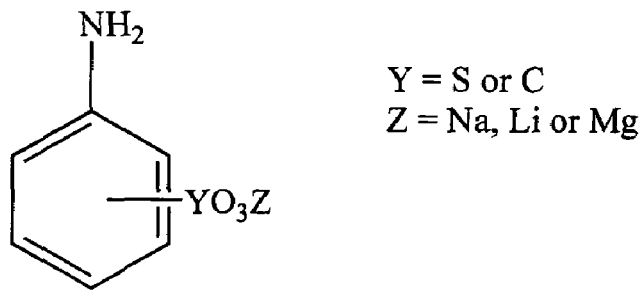
Figure 1:
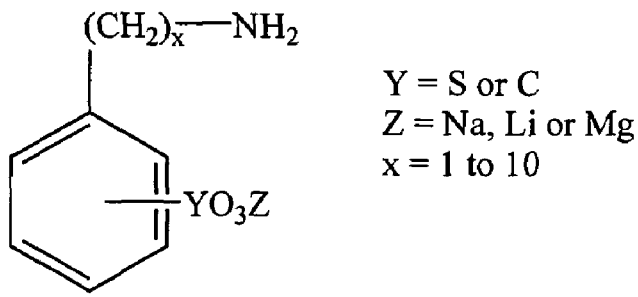

The present invention discloses a method of inhibiting polymer formation and also for dissolving polymers formed during reaction, as well as dissolving of existing polymers. The invention is directed toward inhibition of polymerization of carbonyl compounds, both low molecular weight species and high molecular weight polymers. Such polymers lead to deposit formation in caustic or alkaline scrubbers that are used for scrubbing acidic gases (e.g., carbon dioxide, hydrogen sulfide) from the effluent streams formed during pyrolytic cracking of hydrocarbons like naphtha, ethane, and propane. The cracking operations also produce oxygenated compounds such as vinyl acetate or acetaldehyde, which undergo polymerization under the alkaline conditions in the scrubber. Upon hydrolysis under alkaline conditions, vinyl acetate releases acetaldehyde, which further contributes to the buildup of polymeric deposits.

Use of Inorganic Salts Such as Sodium Dithionite

The most preferred embodiment of the present invention includes a method wherein certain inorganic salt, like sodium dithionite, is introduced into the feed stream to caustic wash unit system, in order to mitigate fouling. The addition of sodium dithionite causes mitigation of fouling through a dual function. First, sodium dithionate inhibits polymerization, by dissolving the polymers formed during the reaction. If a polymer is formed by escaping the inhibition action or if a polymer already exists in the system before the addition of the additive, sodium dithionite dissolves the same. Second, addition of sodium dithionite mitigates fouling by dissolving the polymers already existing in the caustic scrubber.

In this most preferred embodiment of the present invention the inorganic salt like sodium dithionite should be added to the alkaline scrubber in an amount wherein a molar ratio of carbonyl compound to inorganic salt is from about 1:0.01 to about 1:25 mole, preferably from about 1:0.05 to about 1:0.005 mole, and more preferably from about 1:1 to about 1:0.01 mole. The preferred amount of additive ranges from about 0.5 to about 1,000,000 parts of additive per one million part of the aqueous scrubbing medium used in the caustic wash unit system; more preferably, the amount of additive ranges from about 25 to about 200 ppm. The sodium dithinoite as an additive can be added as neat product or in any form available commercially, or as a solution in water or alkali.

Referring to experiments 1 and 2 in Table 1, the use of 0.15 M sodium dithionite yields relative transmittance value T of 68.5%, as compared to the 0.5% T value of the blank without inhibitor. The blank run in the example corresponds to the amount of unscavenged carbonyl low molecular weight species, high molecular weight polymers, and already existing polymer. This example demonstrates the efficiency of sodium dithionite in inhibiting polymer formation.

Referring to experiments 1 and 2 in Table 3, the T value is 0.5% for the blank and 62.5% for sodium dithionite. This example suggests the effect of addition of sodium dithionite on dissolving of polymer deposits. Those skilled in the art are aware that even a slight delay in the addition of additive leads to formation and deposition of polymers. Sodium dithionite has the ability to dissolve deposited polymers.

Use of Combinations of Inorganic Salt Like Sodium Dithionite and Organic Aliphatic Amino Acid and its Derivatives Another embodiment of the present invention includes a method wherein said inorganic salt sodium dithionite is blended in synergistic combination with aliphatic amino acid, including but not limited to 6 amino caproic acid, to mitigate polymerization effects in a caustic wash unit system. The blend of sodium dithionite and aliphatic amino acids mitigates fouling through a dual function, of (i) inhibiting polymer formation and dissolving polymers formed during the reaction, as well as (ii) dissolving polymers already existing in the caustic scrubber.

In this embodiment of the present invention the blend of inorganic salt (like sodium dithionite) and the aliphatic amino acid (like 6 amino caproic acid) is added to the alkaline scrubber in an amount wherein a molar ratio of carbonyl compound to said blend is from about 1:0.01 to about 1:25 mole, preferably from about 1:0.05 to about 1:0.005 mole, and more preferably from about 1:1 to about 1:0.01 mole. The amount of additive ranges from about 0.5 to about 1,000,000 parts of inhibitor per one million part of the aqueous scrubbing medium used in the caustic wash system, more preferably, the amount of additive ranges from about 25 to about 200 ppm.

Figure 2:
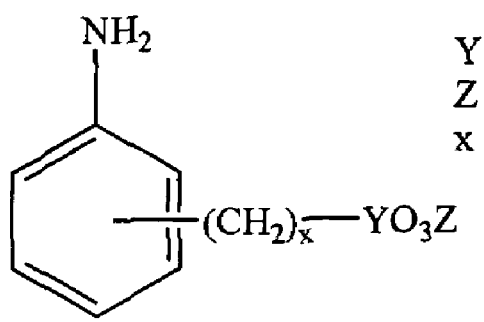
Figure 2:
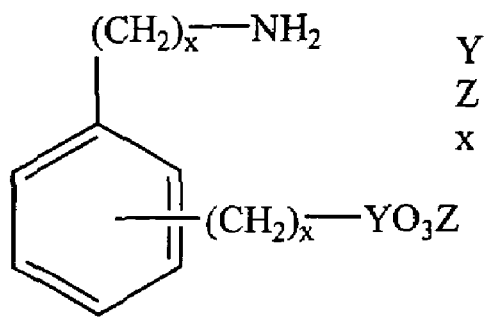
Figure 2:
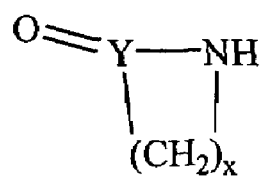

The combination of inorganic salt and the aliphatic amino acids can be added either as blend or as individual components in neat or solution form. The amino acid can be added either as neat product or as an aqueous solution containing from about 0.05 to about greater than about 60 weight percent, preferably from about 18 to about 38 weight percent. Amino acids that are particularly suited for use in the accordance with this embodiment of the invention include, but are not limited to, 6 amino acid such as the amino hexanoic acid made from epsilon caprolactam, glycine, or taurine, or any compound having one of the structures described in FIGS. 1 and 2. Also suitable are the derivatives, isomers, and inorganic or organic salts of these compounds. The amino acids mentioned above can be used in its salt form or as pure amino acid or impure form or combinations thereof.

Referring to experiments 1, 2, and 3 in Table 2, the results further support the advantageous synergistic effect of the compounds used to inhibit polymerization. With 0.1 M sodium dithionite, the relative transmittance value T is 18.5%. With 0.026 M amino caproic acid, the relative transmittance value T is 0.3%; however, the 0.126 M combination of sodium dithionoite and amino caproic acid yields relative T value of 82%. The experiment 4 in Table 2 shows that the amino caproic acid synthesized from caprolactam shows similar behavior. These experiments demonstrate the advantage of combining sodium dithionite and amino caproic acid to inhibit polymer formation.

Referring to experiments 1, 2, 3 and 4 in Table 3, the combination of sodium dithionite and amino caproic acid also acts synergistically in dissolving the polymer. The T value for individual components is 62.5% for 0.5 M sodium dithionite, and 0.5% for 0.087 M amino caproic acid, but the blend of the two compounds at a total mole ratio of 0.5879 has a T value of 77.05%. This example demonstrates the advantageous effect of combining sodium dithionite and amino caproic acid to inhibit polymerization and to dissolve polymer residues.

Use of Combinations of Inorganic Salts Like Sodium Dithionite and Lactam and its Derivatives Further embodiment of the present invention includes a method, wherein blends of inorganic salt like sodium dithionite and certain lactams, including but not limited to epsilon caprolactam, are used to mitigate the effects of polymerization in the caustic wash unit system. Thus a blend of inorganic salts like sodium dithionite and lactam, particularly epsilon caprolactam, not only inhibits polymer formation but also dissolves the polymers already existing in the caustic scrubber.

In this embodiment of the present invention the blend of inorganic salt (like sodium dithionite) and the lactam (like epsilon caprolactam) is added to the alkaline scrubber in an amount wherein a molar ratio of carbonyl compound to said blend is from about 1:0.01 to about 1:25 mole, preferably from about 1:0.05 to about 1:0.005 mole, and more preferably from about 1:1 to about 1:0.01 mole. The amount of additive ranges from about 0.5 to about 1,000,000 parts of inhibitor per one million part of the aqueous scrubbing medium used in the caustic wash system; more preferably, the amount of additive ranges from about 25 to about 200 ppm. Inorganic salts and the lactam or sultam can be added either individually or in combination, in neat or solution form. The lactam can be added either as neat product or as an aqueous solution containing from about 0.05 to about greater than about 60 weight percent, preferably from about 18 to about 38 weight percent. Lactams that are particularly suited for use in the accordance with this embodiment of the invention include, but are not limited to, epsilon caprolactam. However, any compound having one of the structures described in FIGS. 1 and 2 should be effective. Also suitable are the derivatives, isomers, and inorganic or organic salts of these compounds.

When amino acids or lactams are used along with the inorganic salts, particularly sodium dithionite, they react with unscavenged carbonyl compounds, low molecular weight species, high molecular weight polymers and with already existing polymers. Acting synergistically, the amino acid and the inorganic salt solubilize the polymers formed and prevent precipitation and fouling of the equipment.

Referring to experiments 1, 7, and 8 in Table 2, a highly synergistic effect on inhibition of polymerization is seen between sodium dithionite and caprolactam. Individually used 0.1 M sodium dithionite has a T value of 18.5%; individually used 0.3 M caprolactam has a T value of 0.4%. Shown in experiment eight, 0.25 M caprolactam and sodium dithionite has a T value of 82.9%. This shows the advantage of combining sodium dithionite and caprolactam in inhibiting polymerization.

Experiments no 2, 6 and 7 in Table 3 show a synergistic effect of sodium dithionite and caprolactam on dissolving of polymers. Used individually, 0.5 M sodium dithionite has a relative T value of 62.5%; used individually, 0.3 M caprolactam has a T value of 11.4%. The combination of both sodium dithionite and caprolactam has a T value of 69.7%. This shows the advantage of combining sodium dithionite and caprolactam in dissolving the existing polymers.

Use of Combinations of Inorganic Salt Like Sodium Dithionite and Aromatic Amino Acid and its Derivatives Yet another embodiment of the present invention includes a method wherein, to mitigate the effects of polymerization in the caustic wash unit system, sodium dithionite is blended in synergistic combination with aromatic amino acids including, but not limited to, sulfanilic acid. The blends of inorganic salt like sodium dithionite and aromatic amino acids, particularly sulfanilic acid, inhibit polymer formation. In this embodiment of the present invention the blend of inorganic salt, like sodium dithionite, and the aromatic amino acid, like sulfanilic acid, are added to the alkaline scrubber in an amount wherein the molar ratio of carbonyl compound to said blend is from about 1:0.01 to about 1:25 mole, preferably from about 1:0.05 to about 1:0.005 mole, and more preferably from about 1:1 to about 1:0.01 mole. The amount of additive ranges from about 0.5 to about 1,000,000 parts of inhibitor per one million part of the aqueous scrubbing medium used in the caustic wash system, more preferably the amount of additive ranges from about 25 to about 200 ppm. The inorganic salt and the aromatic amino acids can be added either as blend or as individual components in neat or solution form. The aromatic amino acid can be added either as neat product or as an aqueous solution containing from about 0.05 to about greater than about 60 weight percent, preferably from about 18 to about 38 weight percent. Aromatic amino acids that are particularly suited for use in the accordance with this embodiment of the invention include, but are not limited to, aromatic amino acid such as sulfanilic acid, or any compound having one of the structures described in FIGS. 1 and 2. Also suitable are the derivatives, isomers, and inorganic or organic salts of these compounds. The aromatic amino acids mentioned above can be used in its salt form or as pure aromatic amino acid or impure form or combinations thereof.

Referring to experiment 1, 5, 6 of table 2, a synergistic effect of inhibition of polymerization is seen when sulfanilic acid and sodium dithionite are used. The relative T value of individually used 0.1 M sodium dithionite is 18%, for 0.16 M sulfanilic acid T is 0.2%, whereas 0.26 M of the blend has a T value of 86.7%. This shows the advantage of combining sodium dithionite and sulfanilic acid to inhibit polymer formation.

Use of Inorganic Salt Like Sodium Metabisulphite

Still another embodiment of the present invention includes a method wherein certain inorganic salt, like sodium metabisulphite, is introduced into the feed stream to a caustic wash unit system to mitigate fouling, by inhibiting polymer formation. In this embodiment of the present invention the inorganic salt, like sodium metabisulphite, is added to the alkaline scrubber in an amount wherein the molar ratio of carbonyl compound to inorganic salt is from about 1:0.01 to about 1:25 mole, preferably from about 1:0.05 to about 1:0.005 mole, and more preferably from about 1:1 to about 1:0.01 mole. The preferred amount of additive ranges from about 0.5 to about 1,000,000 parts of additive per one million part of the aqueous scrubbing medium used in the caustic wash unit system, more preferably the amount of additive ranges from about 25 ppm to about 200 ppm. The sodium metabisulphite as an additive can be added as neat product or in any form available commercially or as a solution in water or alkali.

Also referring to the experiments 10, 14, and 7 in Table 1, 0.125 M of sodium bisulphite has a relative T value of 2.8%, 0.125 M of sodium sulphite has a T value of 0.35%, whereas 0.125 M of sodium metabisulphite has a T value of 80.7%. These experiments demonstrate the superiority of using sodium metabisulphite to inhibit polymer formation.

Use of Combinations of Inorganic Salts Like Sodium Dithionite and Sodium Metabisulphite Yet another embodiment of the present invention includes a method wherein said inorganic salt sodium dithionite is blended in synergistic combination with another inorganic salt like sodium metabisulphite, to mitigate the effects of polymerization in the caustic wash unit system. In this embodiment of the present invention the blend of inorganic salts, like sodium dithionite and sodium metabisulphite, is added to the alkaline scrubber in an amount wherein the molar ratio of carbonyl compound to said blend is from about 1:0.01 to about 1:25 mole, preferably from about 1:0.05 to about 1:0.005 mole, and more preferably from about 1:1 to about 1:0.01 mole. The amount of additive ranges from about 0.5 to about 1,000,000 parts of inhibitor per one million part of the aqueous scrubbing medium used in the caustic wash system, more preferably the amount of additive ranges from about 25 to about 200 ppm. The inorganic salts can be added as a blend or as individual components. The salts can be added either as neat products, as aqueous solutions, or as alkaline solutions or blends thereof.

Referring to experiment 1, 9, 12 in table 2, a synergistic effect of polymer inhibition is seen between sodium metabisulphite and sodium dithionite. The % T value of the individual components that is sodium dithionite in molar of 0.1 is 18, for sodium metabisulphite in the mole ratio of 0.0.09 the % T value is 35 where as the blend at the sum total mole ratio of 0.19 has a % T value of 93%. Thus this proves the excellent efficiency of combination of sodium dithionite and sodium metabisulphite in effecting inhibition of polymer formation.

Premixed Additives for Caustic Wash Unit Systems Serve Carbonyl Scavenging Function Yet further embodiment of the present invention includes a method of converting the usual caustic wash unit system, commonly known as caustic tower, into a carbonyl scavenging tower. This conversion can be achieved by premixing the additives described above, either individually or as combinations of compounds, with the caustic solution, before the caustic solution is admitted into the caustic tower. In the current practice, the additives are externally added to the tower by a separate supply unit. One disadvantage of this practice is that the tower may run only with caustic solution without additive in case of failure of the unit that supplies the additive. Those skilled in the art are aware that even a minor delay is detrimental for the unit because the polymer formation of the carbonyl compounds is extremely rapid and takes place within a few minutes.

To serve the purpose of the invention, the additive should be stable in the caustic solution for reasonably long period of time. Referring to examples 4 and 5, the inorganic salts like sodium dithionite and sodium metabisulphite, once added to the caustic solution, effectively prevent polymer formation for up to 20 days. This is a very economical solution for scavenging of carbonyl compounds in the petrochemical industries.

For purposes of this invention, low molecular weight species are defined as polymers having 2 or 3 repeating units of acetaldehyde, whereas high molecular weight polymers are defined as polymers having greater than 3 repeating units of acetaldehyde.

The following Examples are merely illustrative of some embodiments of the present invention and the manner in which it is can be performed, and are not intended to limit the scope of the claimed invention in any way:

EXAMPLE 1

Caprolactam (18 g, 0.1593 mole), sodium hydroxide (7 g, 0.175 mole), and 75.0 g water were added to a clean round bottom flask equipped with a thermometer, stirrer and condenser. The mixture was well agitated and heated to 105-120° C. for a period of six hours. Small samples were periodically withdrawn and checked for conversion using HPLC. The conversion of epsilon caprolactam to six amino hexanoic acid was greater than 75%.

EXAMPLE 2

Twenty ml of 10% NaOH solution were added to a 50 ml stoppered conical flask. Desired inhibitor in solution or in solid form was also added, followed by the addition of 1 ml vinyl acetate. The mixture was shaken well and kept in an oven for 24 hours at 55° C. A blank was prepared wherein all reagents except the inhibitor were added. At the end of 24 hours the contents of the flask were visually checked for clarity or any deposits, and UV readings were measured. The results, as an average of two or free reading, are shown in the Tables below.

TABLE 1

Use of individual compounds to inhibit polymer formation.

| Expt No. | Compounds | gms | Mole ratio | Transmittance at 800 nm (T %) | Relative absorbance at 720 nm | Observation |
|---|---|---|---|---|---|---|
| 1 | Blank | nil | nil | 0.5 | 2.5 | Red hazy liquid with precipitate |
| 2 | Sodium dithionite | 0.2075 | 0.125 | 68.5 | 0.2575 | Red slightly hazy liquid |
| 3 | Sodium dithionite | 0.4715 | 0.250 | 89.55 | 0.0475 | Red clear liquid |
| 4 | Sodium dithionite | 0.943 | 0.5 | 90 | 0.042 | Faint red clear liquid |
| 5 | Sodium dithionite | 1.886 | 1.0 | 80.35 | 0.09 | Colorless liquid |
| 6 | Sodium metabisulphite | 0.1281 | 0.0625 | 0.466 | 2.54 | Red hazy liquid |
| 7 | Sodium metabisulphite | 0.2562 | 0.125 | 80.7 | 0.179 | Red clear liquid |
| 8 | Sodium metabisulphite | 0.549 | 0.25 | 86.4 | 0.113 | Red clear liquid |
| 9 | Sodium metabisulphite | 2.089 | 1.0 | 87.3 | 0.066 | Red clear liquid |
| 10 | Sodium bisulphite | 0.140 | 0.125 | 2.8 | 1.80 | Hazy red liquid |
| 11 | Sodium bisulphite | 0.338 | 0.30 | 86.1 | 0.133 | Red clear liquid |
| 12 | Sodium bisulphite | 0.563 | 0.50 | 86 | 0.1035 | Red clear liquid |

TABLE 1-continued

Use of individual compounds to inhibit polymer formation.

| Expt No. | Compounds | gms | Mole ratio | Transmittance at 800 nm (T %) | Relative absorbance at 720 nm | Observation |
|---|---|---|---|---|---|---|
| 13 | Sodium bisulphite | 1.127 | 1.0 | 89.1 | 0.092 | Red clear liquid |
| 14 | Sodium sulphite | 0.170 | 0.125 | 0.35 | 2.653 | Red hazy liquid |
| 15 | Sodium sulphite | 0.682 | 0.5 | 83.6 | 0.130 | Red clear liquid |
| 16 | Sodium sulphite | 1.365 | 1.0 | 89.2 | 0.08 | Red clear liquid |
| 17 | Sodium sulfate | 1.539 | 1.0 | 5.9 | 1.904 | Hazy liquid with gummy polymer |
| 18 | Sodium hydrogen sulfate | 1.496 | 1.0 | 4.4 | 1.332 | Same as above |

TABLE 2

Use of blends to inhibit polymer formation

| Expt No. | Compounds | Gms | Moles of | Moles of | Total moles | Transmittance at 800 nm (T %) | Relative absorbance at 720 nm | Observation |
|---|---|---|---|---|---|---|---|---|
| 1 | Sodium Dithionite | | 0.1 | — | 0.1 | 18.5 | 0.842 | Red hazy liquid |
| 2 | Amino caproic acid | 0.0372 | — | 0.026 | 0.026 | 0.3 | 2.571 | Closer to blank |
| 3 | Sodium Dithionite + Amino caproic acid | 0.1886 0.0372 | 0.1 | 0.026 | 0.126 | 82 | 0.183 | Red clear transparent liquid |
| 4 | Sodium dithionite + Product of Example 1 | 0.1886 0.09 ml | 0.1 | 0.026 | 0.126 | 81.0 | 0.210 | Red clear transparent liquid |
| 5 | Sodium dithionite + sulfanilic acid | 0.1886 0.3 | 0.1 | 0.160 | 0.260 | 86.7 | 0.1195 | Red clear transparent liquid |
| 6 | Sulfanilic acid | 0.30 | | 0.160 | 0.160 | 0.2 | 2.872 | Red brown hazy with particles |
| 7 | caprolactam | 0.3673 | | 0.3 | 0.3 | 0.4 | 2.783 | Dark red slight hazy liquid with some dispersed particles |
| 8 | Caprolactam + sodium dithionite | 0.1836 0.1886 | 0.1 | 0.15 | 0.250 | 82.9 | 0.176 | Red clear transparent liquid |
| 9 | Sodium meta bisulphite + sodium dithionite | 0.1853 0.1866 | 0.1 | 0.09 | 0.190 | 93.3 | 0.067 | Faint Red clear transparent liquid |
| 10 | Sodium dithionite + Amino caproic acid | 0.1132 0.0888 | 0.06 | 0.0625 | 0.123 | 81 | 0.285 | Red clear transparent liquid |
| 11 | Amino caproic acid | 0.0888 | | 0.0625 | 0.0625 | 0.3 | 2.872 | Same as blank |
| 12 | Sodium metabisulphite | | 0.09 | | | 35 | | Red hazy liquid with polymer particles |

EXAMPLE 3

Twenty ml of 10 % NaOH solution were pipetted into a 50 ml stoppered conical flask. One ml of vinyl acetate solution was added. The mixture was shaken well and kept in an oven for 15 minutes. During this period, the vinyl acetate was hydrolyzed and polymerized to form insoluble products. After 15 minutes the desired amount of inhibitor was added. One control sample was prepared without inhibitor. The flask was shaken well and kept in an oven for 24 hours. After 24 hours, the flask was checked visually for clarity and for any deposits. In some cases, UV transmittance was measured for comparison.

TABLE 3

Use of compounds and their blends to dissolve formed polymers

| Expt No. | Compounds | gms | moles | Moles of | Total moles | Transmittance at 800 nm (T %) | Relative absorbance at 720 nm | Observation |
|---|---|---|---|---|---|---|---|---|
| 1 | blank | nil | nil | nil | nil | 0.5 | 2.5 | Red turbid liquid with polymer particles |
| 2 | Sodium Dithionite | 0.943 | 0.5 | — | 0.5 | 62.5 | 0.202 | Yellow clear liquid with few particles |
| 3 | Amino caproic acid | 0.125 | | 0.087 | 0.087 | 0.5 | 2.709 | Same as above |
| 4 | Sodium Dithionite + Amino caproic acid | 0.943<br>0.125 | 0.5 | 0.0879 | 0.5879 | 77.05 | 0.1125 | Red clear transparent liquid |
| 5 | Sodium dithionite + Product of Example 1 | 0.943<br>0.3 ml | 0.5<br>0.087 | | 0.5879 | 85.7 | 0.07 | Red clear transparent liquid |
| 6 | caprolactam | 0.3673 | 0.3 | | 0.3 | 11.4 | 1.095 | Hazy red liquid with particles |
| 7 | Sodium dithionite + caprolactam | 0.943<br>0.3673 | 0.5 | 0.3 | 0.8 | 69.7 | 0.171 | Clear red liquid with few particles |
| 8 | caprolactam | 0.6122 | 0.5 | | 0.5 | 64.0 | 0.387 | Dark red liquid with few particles |
| 9 | caprolactam | 1.224 | 1.0 | | 1.0 | 70.0 | 0.315 | Red clear liquid |
| 10 | Sodium bisulphite | 1.127 | 1.0 | | 1.0 | 10.7 | | Brown hazy liquid with heavy polymer particles |
| 11 | Sodium metabisulphite | 1.0 | 1.0 | | 1.0 | 18.7 | 0.729 | Brown hazy liquid with heavy polymer particles |
| 11 | Sodium sulphite | 1.365 | 1.0 | | 1.0 | 4.3 | 1.389 | Brown hazy liquid with heavy polymer particles |

EXAMPLE 4

The stability of the caustic solution was also tested. For this experiment, 0.3 mole strength of sodium dithionite was prepared in 10% NaOH solution. The transparency of this sodium dithionite solution was periodically tested. To 20 ml of the solution, 1 ml vinyl acetate was added. The flask was shaken well and kept in the oven at 55° C. for 24 hours. The detailed results are listed in Table 4 below.

TABLE 4

Test of the stability of the caustic solution

| Sr. No. | Hours | Relative transmittance (T %) at 800 nm | Relative absorbance at 720 nm | Observation |
|---|---|---|---|---|
| 1 | 24 | 90.3 | 0.122 | Red clear transparent liquid |
| 2 | 192 | 85.3 | 0.145 | Red clear transparent liquid |
| 3 | 240 | 87.9 | 0.140 | Red clear transparent liquid |
| 4 | 360 | 90.9 | 0.129 | Red clear transparent liquid |
| 5 | 480 | 87.3 | 0.142 | Red clear transparent liquid |

EXAMPLE 5

The effect of sodium metabisulphite was also tested. In that case, 0.2 M of sodium dithionite was prepared in 10% NaOH solution. The transparency of this sodium dithionite solution was periodically tested. To 20 ml of the solution 1 ml vinyl acetate was added and shaken well. The flask was kept in the oven at 55 deg c for 24 hrs. The details of the result are listed in the Table 5 given below

TABLE 5

Effect of sodium metabisulphite.

| Sr. No. | Hours | Relative transmittance (T %) at 800 nm | Relative absorbance at 720 nm | Observation |
|---|---|---|---|---|
| 1 | 24 | 90.7 | 0.095 | Red clear transparent liquid |
| 2 | 72 | 90.8 | 0.109 | Red clear transparent liquid |
| 3 | 168 | 90.3 | 0.105 | Red clear transparent liquid |
| 4 | 216 | 88.7 | 0.118 | Red clear transparent liquid |
| 5 | 336 | 90.4 | 0.116 | Red clear transparent liquid |

While the present invention has been described herein in terms of various embodiments, one of ordinary skill in the art will recognize that modification to the embodiments can be made without departing from the scope of the claimed invention. While the above description contains many specificities, these should not be construed as limitations in the scope of the invention but rather as exemplifications of different embodiments thereof. Accordingly, the scope of the invention should be determined not by the embodiments illustrated but by the appended claims and their legal equivalents.

What is claimed is:

1. A method for mitigating fouling in a wash unit used in a hydrocarbon cracking process wherein said fouling is due to the presence of polymers and deposits thereof formed by condensation of carbonyl compounds contained within a feed stream of said wash unit under alkaline conditions, the method comprising the step of:
   introducing into said feed stream an effective amount of an additive consisting of:
   (a) an inorganic salt of dithionite; and
   (b) 6-amino caproic acid;
   wherein said effective amount of additive inhibits formation of polymers of carbonyl compounds, and dissolves the polymers which are formed in spite of the inhibitory action; dissolves the polymers that exist in a caustic scrubber, and reacts with non-polymerized carbonyl compounds, low molecular weight species; high molecular weight carbonyl polymers to form the compound which is soluble in the caustic solution to thereby mitigate fouling in the wash unit,
   wherein said inorganic salt of dithionite and 6-amino caproic acid are blended, and
   wherein said additive scavenges the carbonyl compounds under alkaline conditions.

2. The method according to claim 1 wherein a molar ratio of carbonyl compounds to additive in the feed stream is from about 1:0.01 to about 1:25.

3. The method according to claim 1 wherein the molar ratio of carbonyl compounds to additive in the feed stream is from about 1:0.01 to about 1:1.

4. The method according to claim 1 wherein the effective amount of additive is contained within a scrubbing medium at a concentration of from about 0.5 to about 1,000,000 ppm, said scrubbing medium introduced into the feed stream at the wash unit.

5. The method according to claim 1 wherein the effective amount of additive is contained within a scrubbing medium at a concentration of from about 25 to about 200 ppm, said scrubbing medium introduced into the feed stream at the wash unit.

6. The method according to claim 1 wherein said effective amount of additive is pre-mixed with a scrubbing medium and said scrubbing medium is then introduced into the feed stream at the wash unit.

7. The method according to claim 1 wherein said inorganic salt of dithionite and 6-amino caproic acid are blended and subsequently added to the scrubbing medium before introduction of said scrubbing medium into the feed stream.

8. A method for mitigating fouling in a wash unit used in a hydrocarbon cracking process wherein said fouling is due to the presence of polymers and deposits thereof formed by condensation of carbonyl compounds contained within a feed stream of said wash unit under alkaline conditions, the method comprising the step of:
   introducing into said feed stream an effective amount of an additive consisting of:
   (a) an inorganic salt of dithionite, and
   (b) epsilon caprolactam;
   wherein said effective amount of additive inhibits formation of polymers of carbonyl compounds; dissolves the polymers which are formed in spite of the inhibitory action; dissolves the polymers that exist in a caustic scrubber; and reacts with non-polymerized carbonyl compounds, low molecular weight species, and high molecular weight carbonyl polymers to form the compound which is soluble in the caustic solution to thereby mitigate fouling in the wash unit,
   wherein said inorganic salt of dithionite and epsilon caprolactam are blended, and
   wherein said additive scavenges the carbonyl compounds under alkaline conditions.

9. The method according to claim 8 wherein a molar ratio of carbonyl compounds to additive in the feed stream is from about 1:0.01 to about 1:25.

10. The method according to claim 8 wherein the molar ratio of carbonyl compounds to additive in the feed stream is from about 1:0.01 to about 1:1.

11. The method according to claim 8 wherein the effective amount of additive is contained within a scrubbing medium at a concentration of from about 0.5 to about 1,000,000 ppm, said scrubbing medium introduced into the feed stream at the wash unit.

12. The method according to claim 11 wherein the effective amount of additive is contained within a scrubbing medium at a concentration of from about 25 to about 200 ppm, said scrubbing medium introduced into the feed stream at the wash unit.

13. The method according to claim 8 wherein said effective amount of additive is pre-mixed with a scrubbing medium and said scrubbing medium is then introduced into the feed stream at the wash unit.

14. The method according to claim 8 wherein said inorganic salt of dithionite and epsilon caprolactam are blended and subsequently added to the scrubbing medium before introduction of said scrubbing medium into the feed stream.

15. A method for mitigating fouling in a wash unit used in a hydrocarbon cracking process wherein said fouling is due to the presence of polymers and deposits thereof formed by condensation of carbonyl compounds contained within a feed stream of said wash unit under alkaline conditions, the method comprising the step of:
   introducing into said feed stream an effective amount of an additive consisting of:
   (a) an inorganic salt of dithionite; and
   (b) sulfanilic acid;
   wherein said effective amount of additive inhibits formation of polymers of carbonyl compounds, and reacts with non-polymerized carbonyl compounds, low molecular weight species, and high molecular weight carbonyl polymers to form the compound which is soluble in the caustic solution to thereby mitigate fouling in the wash unit,
   wherein said inorganic salt of dithionite and sulfanilic acid are blended, and
   wherein said additive scavenges the carbonyl compounds under alkaline conditions.

16. The method according to claim 15 wherein a molar ratio of carbonyl compounds to additive in the feed stream is from about 1:0.01 to about 1:25.

17. The method according to claim 16 wherein the molar ratio of carbonyl compounds to additive in the feed stream is from about 1:0.01 to about 1:1.

18. The method according to claim 15 wherein the effective amount of additive is contained within a scrubbing medium at a concentration of from about 0.5 to about 1,000,000 ppm, said scrubbing medium introduced into the feed stream at the wash unit.

19. The method according to claim 18 wherein the effective amount of additive is contained within a scrubbing medium at a concentration of from about 25 to about 200 ppm, said scrubbing medium introduced into the feed stream at the wash unit.

20. The method according to claim 15 wherein said effective amount of additive is pre-mixed with a scrubbing medium and said scrubbing medium is then introduced into the feed stream at the wash unit.

21. The method according to claim 15 wherein said inorganic salt of dithionite and sulfanilic acid are blended and subsequently added to the scrubbing medium before introduction of said scrubbing medium into the feed stream.

* * * * *